United States Patent
Beaudet et al.

(10) Patent No.: US 11,157,759 B2
(45) Date of Patent: Oct. 26, 2021

(54) BIOMETRIC ACQUISITION AND PROCESSING DEVICE AND METHOD

(71) Applicant: Idemia Identity & Security France, Courbevoie (FR)

(72) Inventors: Jean Beaudet, Courbevoie (FR); Alain Thiebot, Courbevoie (FR); Joël-Yann Fourre, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 64 days.

(21) Appl. No.: 16/822,276

(22) Filed: Mar. 18, 2020

(65) Prior Publication Data
US 2020/0302202 A1  Sep. 24, 2020

(30) Foreign Application Priority Data

Mar. 22, 2019 (FR) ...................... 1902978

(51) Int. Cl.
*G06K 9/00* (2006.01)
*G06K 9/20* (2006.01)
(Continued)

(52) U.S. Cl.
CPC ....... *G06K 9/00899* (2013.01); *G06K 9/0004* (2013.01); *G06K 9/00067* (2013.01);
(Continued)

(58) Field of Classification Search
CPC ............. G06K 9/00899; G06K 9/0004; G06K 9/00067; G06K 9/00087; G06K 9/2036;
(Continued)

(56) References Cited

U.S. PATENT DOCUMENTS

| 7,657,066 B2 | 2/2010 | Fondeur et al. |
| 2018/0357461 A1 | 12/2018 | Beaudet |

(Continued)

FOREIGN PATENT DOCUMENTS

| EP | 3 413 233 A1 | 12/2018 |
| FR | 2849246 A1 | 6/2004 |

OTHER PUBLICATIONS

Cuccia, D.J. et al., "Quantitation and mapping of tissue optical properties using modulated imaging," Journal of Biomedical Optics, published online on Apr. 3, 2009, vol. 14, Issue No. 2, pp. 1-13.
(Continued)

*Primary Examiner* — Edward F Urban
*Assistant Examiner* — Wassim Mahrouka
(74) *Attorney, Agent, or Firm* — Womble Bond Dickinson (US) LLP

(57) ABSTRACT

The invention relates to a device for the biometric acquisition and processing of an image of a part of the human body with dermatoglyphs, comprising a contact surface (3) configured so that the part of the human body is affixed to this contact surface (3), a light source (4) configured to project onto the part of the human body a light pattern having a sinusoidal modulation of light intensity in a main direction with a target frequency, an imager (2) configured to acquire an image, and an automated data processing system (7) configured to implement a fraud detection method and a biometric identity recognition method using a periodic component parameter representative of an amplitude of a sinusoidal oscillation of light intensity in the acquired image in accordance with the main direction at the target frequency.

12 Claims, 6 Drawing Sheets

(51) Int. Cl.
   *G06K 9/46*   (2006.01)
   *G06K 9/54*   (2006.01)
   *G06T 5/00*   (2006.01)

(52) U.S. Cl.
   CPC ....... *G06K 9/00087* (2013.01); *G06K 9/2036* (2013.01); *G06K 9/4614* (2013.01); *G06K 9/4661* (2013.01); *G06K 9/54* (2013.01); *G06T 5/001* (2013.01)

(58) Field of Classification Search
   CPC ...... G06K 9/4614; G06K 9/4661; G06K 9/54; G06K 9/0012; G06T 5/001
   See application file for complete search history.

(56) References Cited

U.S. PATENT DOCUMENTS

2018/0365468 A1* 12/2018 Wang .................. G06F 3/04182
2020/0279090 A1*  9/2020 He ..................... G06K 9/00087

OTHER PUBLICATIONS

Correspondence from the French National Institute of Industrial Property Office (INPI—Institute National De La Propriété Industrielle) for FR1902978 dated Dec. 20, 2019; Preliminary Research Report of the French National Institute of Industrial Property Office for FR1902978 dated Dec. 18, 2019; and Written Opinion on the Patentability of the Invention issued by the French National Institute of Industrial Property Office for FR1902978.

* cited by examiner

[Fig. 1]
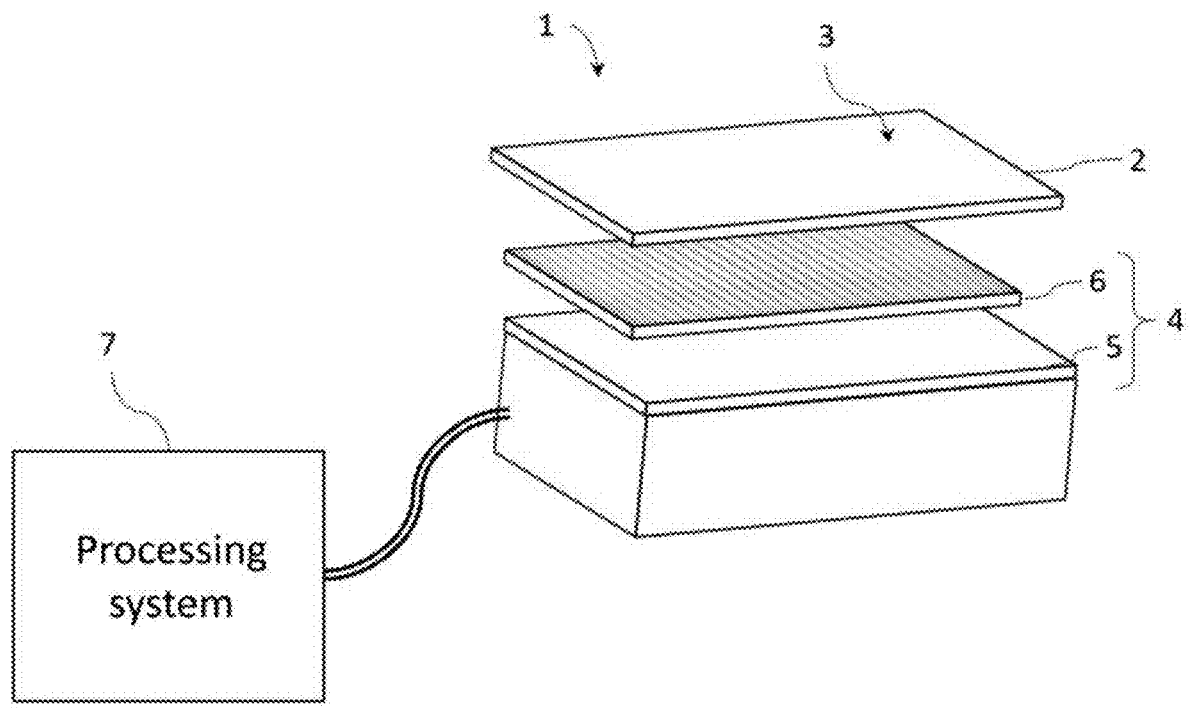
[Fig. 2]
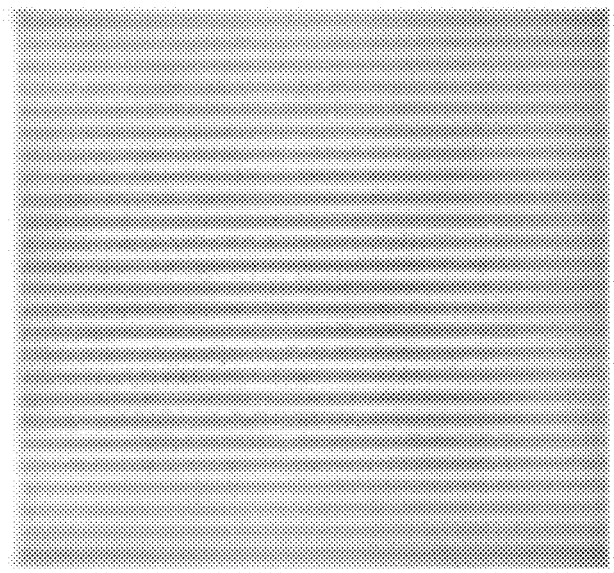

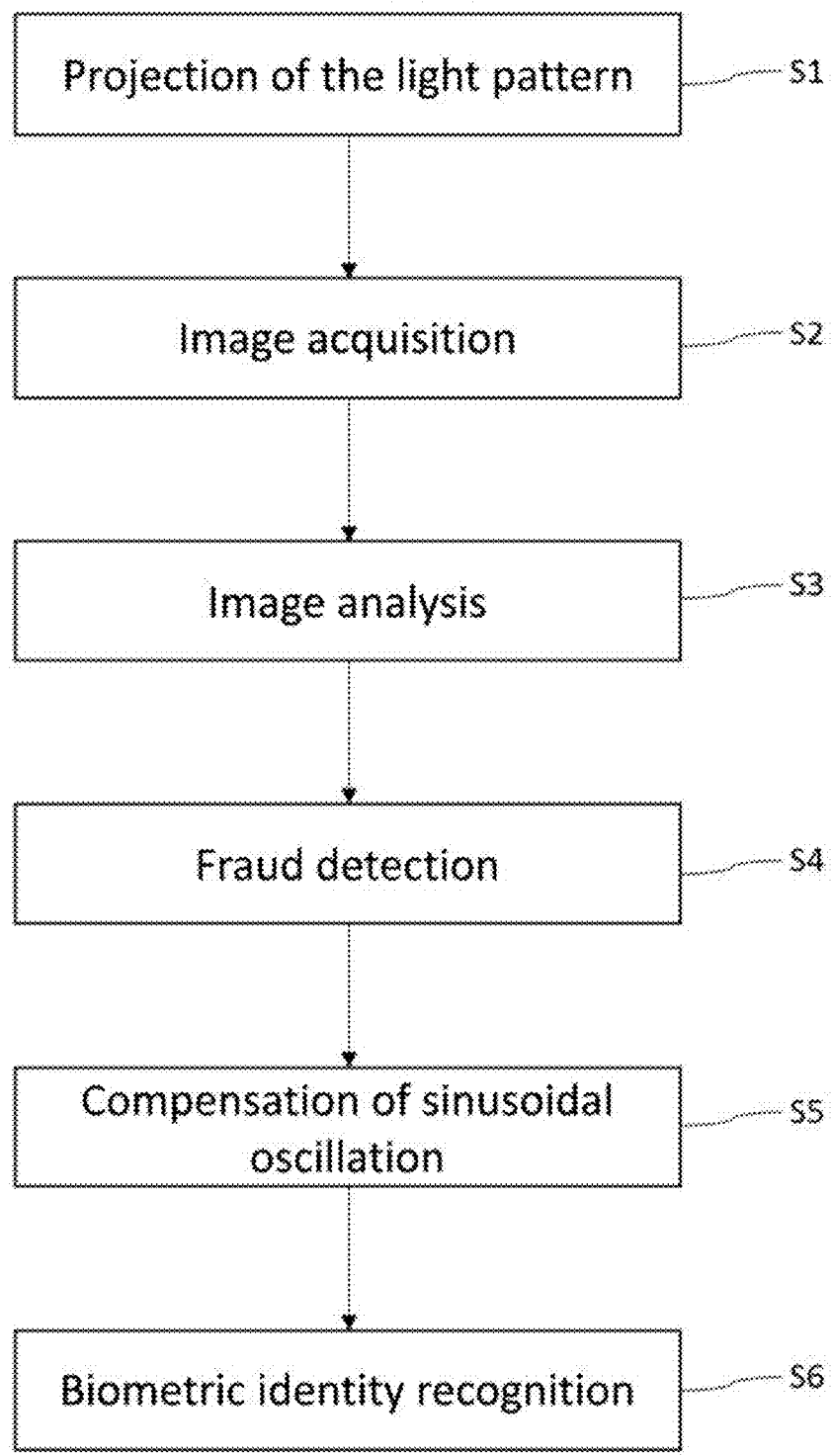

[Fig. 4a]
[Fig. 4b]

[Fig. 5a]
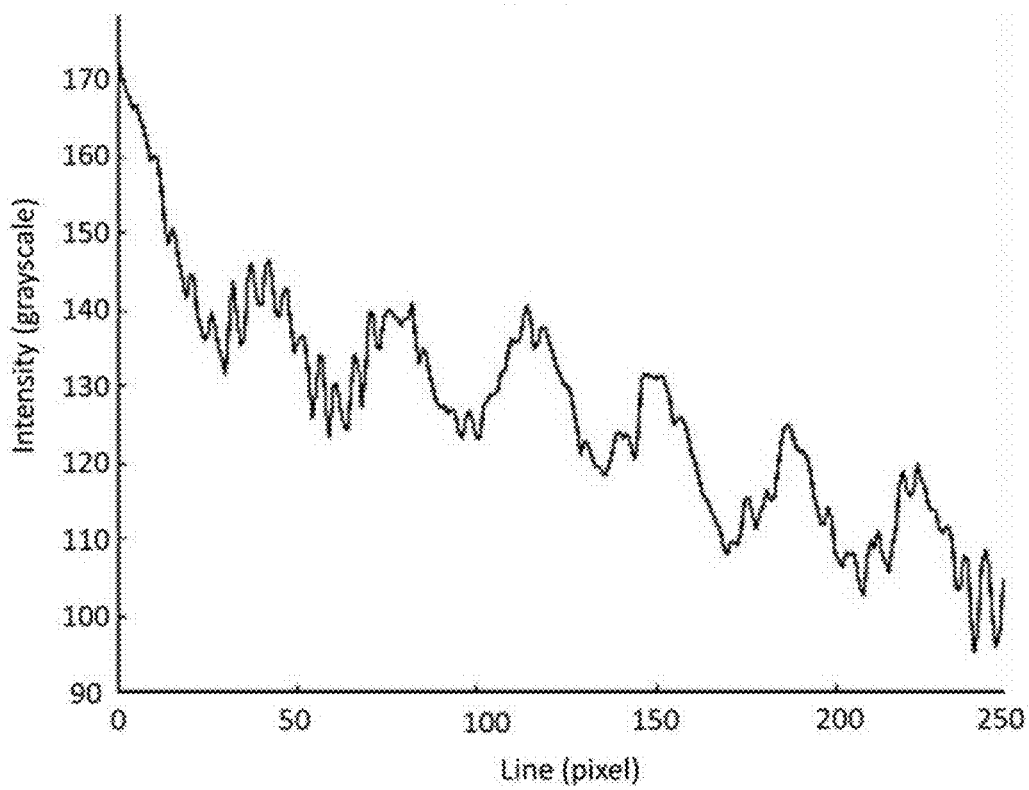
[Fig. 5b]
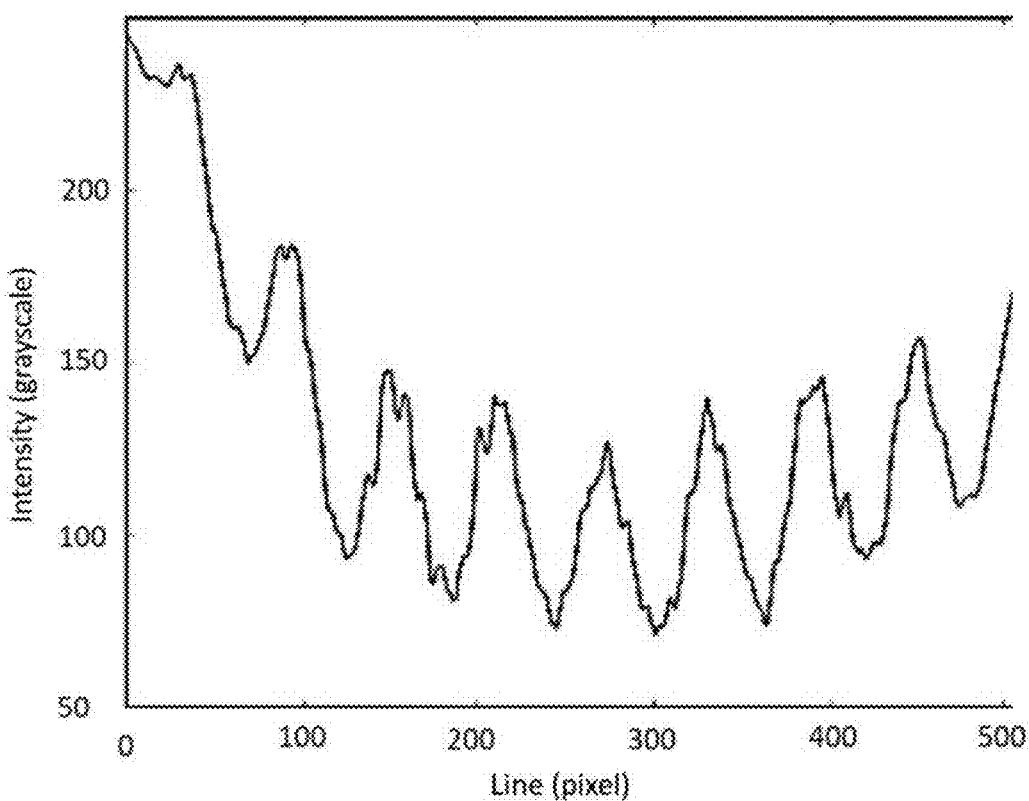

[Fig. 6a]
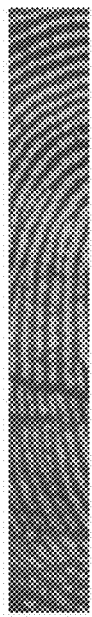
[Fig. 6b]
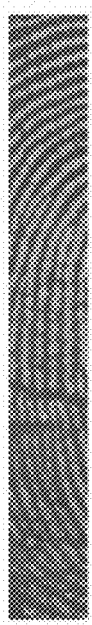

[Fig. 7a]
[Fig. 7b]

BIOMETRIC ACQUISITION AND PROCESSING DEVICE AND METHOD

CROSS-REFERENCE TO RELATED APPLICATIONS

This specification is based upon and claims the benefit of priority from French patent application number FR 1902978 filed on Mar. 22, 2019, the entire contents of which are incorporated herein by reference.

TECHNICAL FIELD

The invention relates to a device and method for the biometric acquisition and processing of an image of a part of the human body with dermatoglyphs, allowing to perform both fraud detection to authenticate that an object is an element of the human body and biometric identity recognition, e.g. biometric identification or enrollment for biometric identification.

STATE OF THE ART

Papillary print identification is one of the most widely used techniques in biometrics. Papillary prints are formed by dermatoglyphs present on the epidermis on the surface of the skin. These dermatoglyphs consist of ridges and valleys, and are a projection of the in-depth pattern present on the dermis. Dermatoglyphs have the benefit of being unique, immutable, and unalterable, unless the dermis is deeply altered.

The human body parts with papillary prints consist principally of the fingers, and these are called fingerprints, but also the palms, the toes, and the soles of the feet. Several technologies are able to acquire papillary prints for identification purposes. The acquisition of an optical image of the fingerprints is the most commonly used and will be used to illustrate the present invention. We will hereafter refer to fingers to designate the part of the human body with papillary prints, and fingerprints to designate papillary prints.

In optical fingerprint identification, an image of an illuminated finger is acquired and analyzed to identify an individual. The most commonly used method is to acquire the image of the finger when it is affixed to a surface, and to use the optical interactions between the finger and that surface to identify the fingerprints, and by comparison against a fingerprint database, to identify the individual.

However, it is possible to use decoys, false fingers that reproduce the characteristics on which the image analysis is based, in particular, reproducing fingerprints. The simplest shape for tricking a biometric sensor based on analyzing the surface of a human finger consists of presenting the sensor with a paper reproduction of a human finger that having fingerprints. Thus, in the ordinary case of fingerprint detection, a photograph is presented, either flat or wrapped around a finger, on which a finger with its fingerprints is reproduced. A more advanced form consists of placing a decoy made of silicon or another material, such as gelatin or latex onto the surface of a finger presented to the sensor, said decoy reproducing fingerprints. It is therefore necessary to provide in addition a fraud detection method to validate that the object analyzed is indeed a feature of the human body, most often a finger.

Different fraud detection methods have been proposed, generally using various properties of a living finger that are more or less difficult to reproduce. For example, a solution described in the application FR2849246 A1 provides for measuring the impedance of the object to be authenticated in order to detect fraud, using transparent electrodes added to the surface of an optical sensor to perform an impedance measurement in addition to the sensor's acquisition of the fingerprint image. This has the defect of adding additional manufacturing process steps to the sensor surface that may, in some cases, be technically difficult to implement if the layers constituting the sensor are fragile such as when using organic elements. This also presents an additional cost in terms of manufacturing and electronics for impedance measurement. It is therefore preferable to be able to detect fraud by means of the image acquired by the imager. It is then not necessary to provide additional features such as impedance measuring instruments. This allows the detection to be implemented in an existing sensor without having to change its architecture, in a simple and inexpensive way.

BRIEF DESCRIPTION OF THE INVENTION

The invention aims to enable the implementation of a method for the biometric acquisition and processing of an image of a part of the human body with dermatoglyphs by means of a simple and inexpensive device, capable of implementing both a fraud detection method to authenticate that the part of the human body is an authentic element of a human body and a biometric identity recognition method based on an image of the part of the human body illuminated by a single light source.

To this end, the invention proposes a device for the biometric acquisition and processing of an image of a part of the human body with dermatoglyphs, comprising:
- a contact surface configured so that the part of the human body is affixed to this contact surface,
  - a light source configured to illuminate the contact surface,
  - an imager configured to acquire an image of the part of the human body affixed to the contact surface,
  - an automated data processing system configured to receive the image acquired by the imager, characterized in that the light source is configured to project on the part of the human body affixed to the contact surface, a light pattern having a sinusoidal modulation of light intensity in a main direction with a target frequency, and in that the automated data processing system is configured to perform the following steps:
  a) analysis of the acquired image to identify in it at least one value of a periodic component parameter and one value of a continuous component parameter of a variation in light intensity in accordance with the main direction, wherein the value of the periodic component parameter is representative of an amplitude of a sinusoidal oscillation of light intensity in the image acquired in accordance with the main direction at the target frequency, wherein the value of the continuous component parameter is representative of an average of the light intensities in the acquired image;
  b) implementation on the basis of the value of the continuous component parameter and the value of the periodic component parameter of a fraud detection method to authenticate that the part of the human body is an authentic feature of a human body;
  c) compensation of the sinusoidal oscillation of the light intensity in the acquired image by multiplying the intensity of the acquired image by a correction function comprising a correction parameter representative of an amplitude of a sinusoidal oscillation of the light intensity in the acquired image in accordance with the main direction at the target frequency, to obtain a compensated image;

d) implementation of a biometric identity recognition method based on the compensated image.

The device is advantageously supplemented by the following characteristics, taken alone or in any of their technically possible combinations:

the correction function corresponds to the inverse of a sinusoidal function taking as a variable a coordinate according to the main direction and whose amplitude is the value of the correction parameter;

the periodic component parameter matches an amplitude of a sinusoidal function taking as variable a coordinate according to the main direction;

the image analysis comprises the determination of a Fourier transform of the intensity distribution of the image, wherein the value of the periodic component parameter is determined from a coefficient of the Fourier transform at the target frequency;

the image analysis comprises the application of a Gabor filter to the acquired image to obtain a filtered image, a parameter of the Gabor filter in accordance with the main direction corresponding to the target frequency, wherein the value of the periodic component parameter is determined from the filtered image;

the value of the periodic component parameter is the sum of the modules of each of the points of the filtered image;

the value of the correction parameter matches the value of the periodic component parameter divided by the continuous component parameter;

the value of the correction parameter is determined from the value of the periodic component parameter using a database associating a correction parameter value with a value of the periodic component parameter;

the value of the correction parameter is determined iteratively by implementing the following steps, for a plurality of values to be tested of the correction parameter:
  the acquired image is compensated by a correction function taking the value of the correction parameter to be tested as a parameter and taking the coordinate in accordance with the main direction as a variable to obtain a compensated image,
  application of a Gabor filter to the compensated image to obtain a filtered image, a parameter of the Gabor filter in accordance with the main direction matching the target frequency,
  determination of a measurement of the presence of sinusoidal oscillation in the filtered image,
wherein the value of the correction parameter is the value to be tested which presents the measurement of the presence of the sinusoidal oscillation in the lowest filtered image;

the light source is equipped with a mask having a sinusoidally variable opacity in accordance with the main direction;

the target frequency is between 0.2 cycle/mm and 0.5 cycle/mm.

The invention also relates to a method for acquiring and processing an image of a part of the human body with dermatoglyphs, wherein said method is carried out by a device comprising:

a contact surface configured so that the part of the human body is affixed to this contact surface, a light source configured to illuminate the contact surface, an imager configured to acquire an image of the part of the human body affixed to the contact surface, an automated data processing system configured to receive the image acquired by the imager, the method comprising the following steps:

the light source projects on the part of the human body affixed to the contact surface a light pattern presenting a sinusoidal modulation of light intensity in a main direction with a target frequency;

the imager acquires an image of the part of the human body affixed to the contact surface illuminated by the light source, and transmits the acquired image to the automated data processing system;

the automated data processing system analyzes the acquired image to identify in it at least one value of a periodic component parameter and one value of a continuous component parameter of a variation in light intensity in accordance with the main direction, wherein the value of the periodic component parameter is representative of an amplitude of a sinusoidal oscillation of the light intensity in the image acquired in accordance with the main direction at the target frequency, wherein the value of the continuous component parameter is representative of an average of the light intensities in the acquired image;

the automated data processing system implements on the basis of the value of the continuous component parameter and of the value of the periodic component parameter a fraud detection method to authenticate that the part of the human body is an authentic feature of a human body;

the automated data processing system compensates the sinusoidal oscillation of the light intensity in the acquired image by multiplying the intensity of the acquired image by a correction function comprising a correction parameter representative of a sinusoidal oscillation amplitude of the light intensity in the acquired image in accordance with the main direction at the target frequency, in order to obtain a compensated image;

the automated data processing system implements a biometric identity recognition method based on the compensated image.

The invention also relates to a computer program product comprising program code instructions recorded on a non-transitory medium for use in a computer for performing the steps of the method according to the invention implemented by the automated data processing system whereupon said program is executed on a computer using said non-transitory medium.

DESCRIPTION OF THE FIGURES

The invention will be better understood through the description below, which relates to embodiments and variants according to the present invention, given as non-limiting examples and explained with reference to the attached schematic drawings, in which:

FIG. 1 schematically illustrates a device for the biometric acquisition and processing of an image of a part of the human body with dermatoglyphs according to a possible embodiment of the invention;

FIG. 2 shows an example of a light source mask adapted to generate the projection of a test pattern having a sinusoidal modulation of light intensity;

FIG. 3 is a diagram illustrating schematically the steps involved in carrying out a method of biometric acquisition and processing of an image of a part of the human body with dermatoglyphs according to a possible embodiment of the invention;

FIG. 4a shows an extract from an example of an image acquired from an authentic finger illuminated by the light source according to a possible embodiment of the invention;

FIG. 4b shows an extract from an example of an image acquired from a false finger illuminated by the light source according to a possible embodiment of the invention;

FIG. 5a shows the intensity profile per line of the image in FIG. 4a;

FIG. 5b shows the intensity profile per line of the image in FIG. 4b;

FIG. 6a shows an extract from an example of an image acquired from an authentic finger illuminated by the light source according to a possible embodiment of the invention;

FIG. 6b shows an extract from an example of a compensated image corresponding to the acquired image in FIG. 6a;

FIG. 7a shows an extract from an example of an image acquired from a false finger illuminated by the light source according to a possible embodiment of the invention;

FIG. 7b shows an extract from an example of a compensated image corresponding to the acquired image in FIG. 7a.

DETAILED DESCRIPTION

Biometric Acquisition and Processing Device

FIG. 1 shows an example of a device for biometric acquisition and processing of an image of a part of the human body with dermatoglyphs. This device substantially comprises a sensor 1 and an automated data processing system. The sensor 1 comprises an imager 2, a contact surface 3 and a light source 4. The contact surface 3 is configured so that the part of the human body, i. e. the finger, is affixed to this contact surface 3. Advantageously, this contact surface 3 can be constituted by a surface of the imager 2 (as shown in FIG. 1) or of the light source 4. The contact surface 3 can also be the surface of a protective layer to protect sensor 1. The light source 4 is configured to illuminate the contact surface 3 which is transparent so that this light also illuminates the finger on the contact surface. The light source 4 is thus configured to illuminate the part of the human body when it is in contact with the surface 3. The imager 2 is configured to acquire an image of the part of the human body affixed to the contact surface 3, through the contact surface 3.

An example of the sensor 1 can be a flat optical sensor with light-sensitive elements constituting the imager 2. These sensors can be embodied on a substrate by thin-film transistor (TFT) technologies, e.g. on glass and organic thin-film transistor (OTFT), e.g. on plastic. Advantageously, the substrate can be transparent and the sensor insensitive to light from the back side. These optical sensors require a light source, provided by the light source 4.

The light source 4 is configured to project on the part of the human body affixed to the surface 3 a light pattern presenting a sinusoidal modulation of light intensity in a main direction with a target frequency at the contact surface 3. Therefore, if the light pattern is projected on an opaque, very diffusing and very absorbent object, where the propagation of light inside the object is negligible, such as paper, placed on the contact surface 3, the light intensity in the acquired image will follow a sinusoidal law in a direction with a target frequency.

The sinusoidal modulation of the light intensity of the light pattern in accordance with the main direction on the x coordinate can be modeled according to the following formula:

$$\alpha \times \cos(2\pi f x + \varphi) + \beta$$

wherein $\alpha$ is the amplitude of the sinusoid, $\beta$ is the average intensity, $\varphi$ is a phase at the origin and f is the (spatial) frequency of the target. The test pattern frequency f is preferably between 0.2 cycle/mm and 0.5 cycle per mm at the contact surface. A frequency that is too high, greater than 0.5 cycle/mm, can lead to difficulties in distinguishing sinusoidal oscillations from ridge information. With a frequency too low, less than 0.2 cycle/mm, there may not be enough oscillations on the finger surface of the acquired image. For example, the target frequency f is preferably 0.33 cycle/mm. The sinusoidal modulation can therefore be expressed by a sinusoidal function of an x-coordinate in accordance with the main direction. A sinusoidal function is a function comprising a trigonometric function (sine or cosine) with a constant added.

The use of sinusoidal modulation of light intensity provides at least three important benefits. The first one is that such a light pattern is stable by blurring: even blurred, the light pattern in the acquired image retains its sinusoidal modulation, and in particular retains the target frequency. Another benefit is that the sinusoidal aspect of the light intensity modulation allows to consider a compensation of this light pattern in the acquired image, as described below. Finally, the sinusoidal modulation of the light intensity of the test pattern means that the incident illumination is not zero on the vast majority of the finger surface affixed to the contact surface 3, and typically the incident illumination is never zero. Such illumination therefore makes it possible to illuminate the affixed surface of the finger sufficiently to implement a biometric identity recognition method, e.g. based on fingerprints, based on an image acquired from the finger illuminated by the light source 4.

The light emitted by the light source 4 is preferably in the visible range, but it can also be only in the infrared range, or be in the visible and infrared range. The light can typically be a white light. The overall intensity of the light emitted by the light source 4 must be sufficient to allow fingerprints to be visualized, in order to allow the implementation of a biometric identity recognition method based on an image acquired from the finger illuminated by the light source 4. As an option, several wavelengths can be emitted at the same time or successively. In this case, the method can be applied independently to each wavelength to determine continuous and periodic component parameters for each wavelength.

In the example in FIG. 1, the light source 4 comprises an illumination member 5 capable of emitting the illumination light and a mask 6 having a sinusoidally variable opacity in a main direction, arranged in front of the illumination member 5. "In front" means the direction in which the surface 3 is located, which is also the illumination direction of the light source 4. The mask 6 allows the light intensity emitted by illumination member 5 to be modified so that the light source 4 projects on the part of the human body affixed to the surface 3 a light pattern having a sinusoidal modulation of light intensity in a main direction with a target frequency.

FIG. 2 presents an example of an opacity pattern presented by the mask 6. This pattern comprises a sinusoidally variable opacity in accordance with the main direction, here in the vertical direction of FIG. 2. The mask 6 can be manufactured in different ways. The pattern of the mask 6 can be, e.g., a transparent plastic medium whereupon the pattern of the mask 6 is printed. It is also possible that the mask 6 consists of the surface of the illumination member 5, whereupon the pattern is then made. For example, it is possible to provide skylights of different sizes for the pixels of the illumination member 5, the sizes of the skylights varying sinusoidally in accordance with the main direction. The masking is preferably done as close as possible to the illumination member 5, to limit the spreading of the projected pattern. It is still possible to provide pixels of the illumination member 5 presenting sizes and/or powers varying sinusoidally in accordance with the main direction.

In addition, it is possible to provide a mask 6 presenting a sinusoidally variable opacity in two orthogonal directions between them, in order to obtain the projection of a light pattern presenting a modulation matching the superposition of two sinusoidal modulations of light intensity in two orthogonal directions with two distinct target frequencies. The same applies to any other solution allowing sinusoidal modulation of light intensity, which may be designed to allow the superposition of two sinusoidal modulations of light intensity in two orthogonal directions with two discrete target frequencies.

Instead of a mask 6, it is possible that the light source 4 is a screen configured to display a display pattern presenting a sinusoidal modulation of light intensity in a main direction, so that this sinusoidal modulation of light intensity is found in the target projected on the finger affixed on the surface 3. The light source 4 can therefore be a L-E coated screen comprising a pixel matrix instead of the mask 6 and an illumination member 5 arranged behind the pixel matrix. The Low-E coated screen may include a matrix of individually controllable pixels. It is also possible that pixels can only be controlled in groups. In particular, since the light intensity is sinusoidally modulated in only one main direction, it is possible to make do with controlling pixels by lines perpendicular to the main direction. This limits the number of transistors required to drive them and places them outside the sensitive surface, which is particularly advantageous, whereupon the lines are made on the same substrate as the imager 2.

The pixel state of the matrix defines the display pattern of the Low-E coated screen. For example, it is a configuration of a liquid crystal device or an OLED type display. The substrate whereupon the light-sensitive features forming the imager 2 can, for example, be above the Low-E coated screen 1, as shown in FIG. 1. The substrate is then transparent to allow the light emitted by the Low-E coated screen 1 to pass. TFT or OTFT technologies, and a glass or plastic substrate can be used.

Another solution is to embody the OLED Low-E coated features on the substrate of the sensor itself. In this particular case, the sensor no longer needs to be transparent. Other configurations are possible, e.g. with a light source 4 comprising a matrix of light-emitting organic diodes, which can be arranged above (i.e. in the direction of illumination) the imager 2. In this case, the surface 3 is that of the light source 4. It is not then necessary for the imager 2 substrate to be transparent. Preferably, in the case of an OLED screen, it must then have a transparency characteristic (allowing at least 2% of the light coming from above to reach the sensor) and light emission only towards the upper side can be used above the sensor 1. It is also possible to arrange the light source 4 to be in the same plane as the imager 2, by interposing the sensitive features of the imager 2 and the light emitting elements.

The imager 2 consists of a substrate whereupon light-sensitive features are embodied. The light source 4 is configured to illuminate the acquisition field of the imager 2. To this end, the light source 4 and the imager 2 can share the same orientation: the light source 4 and the imager 2 can be superimposed, as shown in FIG. 1, or coplanar. It is also possible that the light source 4 and the imager 2 do not share the same orientation, especially when an optical system such as a prism or blade is used to direct light beams to or from the contact surface 3. The light source 4 can then be remote from the imager 2.

The sensor members of the imager 2 are, for example, embodied on a glass substrate and consist of photodetectors, e.g. PIN photodiodes made from silicon, organic photodiodes, or any other light-sensitive feature. The substrate could also be of plastic, or any other suitable material, allowing association with the light source 4.

Sensitive features form addressable pixels, such as readable pixels. In a conventional way, each pixel has a selection transistor, and they are organized in rows and columns. The controls of the selection transistors are common on one line, and the pixel levels are read in columns. Selection or addressing transistors are, for example, thin-film transistors (TFTs). Preferably, the electronics for line addressing of sensitive features are arranged in whole or in part on the substrate, in particular to limit the number of connections of the substrate and therefore the cost of the system, or to allow higher resolutions to be achieved. In the case of a glass substrate, the integration of the electronics required for addressing is facilitated by the use of poly-Si TFT technology or oxide transistor solutions (e. g. zinc gallium indium oxide IGZO). OTFT solutions (organic transistor embodied on glass or more often plastic) also make it possible to embody such a sensor.

The light-sensitive elements of the imager 2 can be designed so that they are not sensitive to light coming directly from the screen. This can be made possible by using the lower electrode embodied in a metal as a light screen. The electrodes can then be used to define the skylights herein before, in order to create a sinusoidal modulation of the light transmission of the imager 2. If necessary, other opaque filings can be used under the sensitive feature. Spaces with no opaque filings are provided between the sensors to allow a portion of the light emitted by the screen to pass through the sensor. This portion can be between 2 and 50%. In the case where OLEDs are embodied on the same substrate as light-sensitive features, there is no longer any particular transparency constraint on the substrate.

The device's automated data processing system 7 may consist of one or more processing units, memory, software, data, input/output and link members, including for controlling the display of the light source 4, the image acquisition by the imager 2, and the image processing acquired by the imager 2. The automated data processing system 7 can be outside the sensor 1, as shown in FIG. 1, and it can be, for example, a computer communicating with the sensor. The automated data processing system 7 can also be integrated into the sensor 1. The automated data processing system 7 can be remote, and connected to the sensor 1 via a communication network. The automated data processing system 7 may consist of more parts, and different parts of the method may be implemented by different parts of the automated data processing system 7, which may be remote from each other and may communicate with each other through a communication network.

Method for Biometric Acquisition and Processing

With reference to FIG. 3, the biometric acquisition and processing of an image is carried out when the finger is placed on the contact surface 3. The light source 4 illuminates the finger through the contact surface 3. The light pattern is then projected on the finger (step S1). The imager 2 then acquires an image of the finger on the contact surface 3, illuminated by the light source 4 (step S2). The imager 2 then transmits the acquired image to the automated data processing system 7.

Due to the light pattern, the acquired image has a sinusoidal variation in light intensity according to the main direction and the target frequency. The acquired image also contains the depiction of the finger surface on the contact surface 3. The values of light intensity of the pixels that define the acquired image are therefore the result of both the structure of the imaged finger and the sinusoidal variation caused by the sinusoidal modulation of light intensity of the light pattern.

Thus, FIG. 4a shows an example from an image acquired with an authentic finger. This acquisition was made with a red light. It can be seen that the fingerprints are clearly visible, but also that the lines defining these fingerprints and the clear areas between them have a sinusoidal variation in the vertical direction of FIG. 4a. However, the rate of sinusoidal variation in the image is moderate. Indeed, the human skin has the characteristic of diffusing light, which reduces the non-uniformity of the illumination, and therefore makes this sinusoidal variation slightly visible in the acquired image. This scattering is even more significant when the wavelength is longer than 600 nm (i.e. in red or infrared). Nevertheless, as mentioned herein before, the sinusoidal aspect of the intensity modulation of the light pattern is preserved in the variation of the intensity in the acquired image, despite this diffusion.

FIG. 4b shows an example from an image acquired with a false finger. More precisely, the false finger used herein is a photographic depiction of a finger printed on paper. Herein again, the acquired image shows fingerprints and a sinusoidal variation in intensity in the vertical direction. In this case, however, this variation appears much more visible than in the previous Figure. In fact, since the false finger does not have all the characteristics of an authentic human finger, the diffusion of the light pattern by the false finger is not that of an authentic finger, and the attenuation of the non-uniform illumination due to the sinusoidal modulation of the light intensity of the pattern is reduced. It should be noted that for other types of fraud, it would be possible to have, conversely, a stronger non-uniformity attenuation than for an authentic finger.

FIGS. 5a and 5b show the intensity profiles per line of the images in FIGS. 4a and 4b, respectively. More precisely, these are the averages per line of the gray scale values of the pixels in these images, based upon the line, in accordance with the main direction (vertical direction in FIGS. 4a and 4b). These intensity profiles clearly show the periodic aspect of the average intensity modulations (per line) in both images. However, we can see that the profiles are quite different, revealing the different natures of the imaged objects—real finger for FIG. 5a and false finger for FIG. 5b.

As a result, the characteristics of the variation in light intensity in the acquired image can be considered as indicative of the optical properties of the material comprising the part of the human body affixed to the contact surface 3, and in particular its absorption and diffusion properties. The variation in light intensity in the acquired image, resulting from the sinusoidal nature of the light intensity modulation of the light pattern, can be characterized by a periodic component parameter and a continuous component parameter, which can be determined to verify the authenticity of the finger. The characteristics of the variation in light intensity in the acquired image thus make it possible to implement a fraud detection method to authenticate that the finger is an authentic feature of a human body.

To this end, the automated data processing system 7 performs an analysis (step S3) of the acquired image to identify in it at least one periodic component parameter of the variation in light intensity according to the main direction and target frequency. Since the sinusoidal aspect of the light pattern is found in the light variation of the acquired image, this variation in intensity in the acquired image can be modeled by a sinusoidal function taking a variable x coordinate in accordance with the main direction:

$$f_{A,B}(x) = A \times \cos(2\pi f x + \varphi) + B$$

wherein A is the periodic component parameter, B is the continuous component parameter, $\varphi$ is a phase at the origin and f is the (spatial) target frequency. The periodic component parameter A corresponds to the amplitude of the sinusoidal function taking as variable the x-coordinate according to the main direction, and therefore matches the acquired image to the amplitude a of the sinusoid of the light projected on the finger. Similarly, the continuous component parameter B matches the acquired image to the average intensity $\beta$ of the sinusoid of the light projected on the finger.

The phase $\varphi$ and the target frequency f are known, since they are not influenced by the properties of the finger material, and therefore match the phase and the target frequency of the light pattern. The phase $\varphi$ and the target frequency f are conserved. On the other hand, the respective values of A and $\alpha$ differ, as do those of B and $\beta$, but they are linked to each other. The periodic component parameter A and the continuous component parameter B thus depend not only on the amplitude a d and the average intensity $\beta$ of the sinusoid of the light projected on the finger, respectively, but also on the material constituting the finger. These are the two parameters that are used to detect false fingers with a fraud detection method. These two parameters are determined by the image analysis.

In a first variant, image analysis may include the calculation of the Fourier transform of the light intensity distribution of the acquired image. The periodic component parameter A is then determined from an amplitude at the target frequency f. More precisely, the periodic component parameter A matches the modulus of the Fourier transform coefficient at the target frequency. The continuous component parameter B is more simply the average of the luminous intensities of the acquired image.

This approach has the benefit of being easy to implement, and does not require too many calculations. However, the periodic component parameter A may be imprecise. Indeed, the acquired image does not have an infinite range, nor does the presence of the variation in light intensity in the acquired image, which has an effect on the results obtained. In addition, the depiction of the finger in the acquired image, and its fingerprints, does not have a periodicity in accordance with the main direction, so that the artifacts are introduced into the calculation of the Fourier transform.

The analysis of the acquired image may include applying a Gabor filter to the acquired image to obtain a filtered image, the periodic component parameter A being determined from the filtered image. A Gabor filter is a linear filter whose impulse response is a sinusoid modulated by a Gaussian function. For the processing of the acquired image, the Gabor filter can be expressed in a complex form:

$$G(x, y) = \exp(2\pi j(f_x x + f_y y) + \phi) \times \exp\left(-\left(\frac{(x-x_0)^2}{\sigma_x^2} - \frac{(y-y_0)^2}{\sigma_y^2}\right)\right) \quad \text{[Math 1]}$$

wherein $f_x$ is the spatial frequency of the variations in accordance with the main direction (x-coordinate), $f_y$ is the spatial frequency of the variations in the other direction (y-coordinate), perpendicular to the main direction. In the case where only a variation in accordance with the main direction is sought, $f_y=0$. The parameters $\sigma_x^2$ and $\sigma_y^2$ are the variances of a Gaussian. $\phi$ is a phase. $x_0$ and $y_0$ are origin coordinates.

In a simplified form, and in particular wherein only the variation of light intensity according to the main direction is sought (and therefore $f_y=0$), we have:

$$G(x) = \exp(2\pi j(fx+)) \times \exp\left(-\frac{x^2}{\sigma^2}\right) \quad \text{[Math 2]}$$

Typically, σ is of the order of the target period (inverse of the target frequency f), e.g. 2 to 6 times the target period. It is also possible to use a mask to truncate the Gabor filter to restrict it to a certain size, e.g. to σ/3 in accordance with the main direction.

The Gabor filter is then applied to the acquired image, i.e. the convolution between the acquired image and the Gabor filter is calculated. The Gabor filter behaves like a low pass, which substantially preserves the oscillation attributable to the target, but removes features of higher spatial frequency, and in particular fingerprints. The filtered image therefore substantially preserves the sinusoidal variation of the light intensity in the acquired image according to the main direction at the target frequency.

Since the application of the Gabor filter substantially preserves the sinusoidal oscillation, the amplitude of the grayscale variations in the filtered image is representative of the amplitude of the sinusoidal oscillation in the acquired image, i. e. the periodic component parameter A. It is therefore possible to determine an estimator of the periodic component parameter A from the filtered image. We can therefore calculate a Gabor module for the filtered image, matching the sum of the modules of each point of the filtered image, which then comprise the periodic component parameter A. As previously indicated, the second continuous component parameter B matches the average of the pixel values of the acquired image.

It is possible, in order to improve the determination of the values of the periodic component parameter A and the continuous component parameter B, to apply the Gabor filter to more parts of the acquired image, and to determine local values for the parameters for each part, from which the values of the periodic component parameter A and the continuous component parameter B are determined for the entire image, e.g., with an average. Under this approach, it is possible to ignore outliers that may result from defects in image acquisition.

For the implementation of step S3 for analyzing the acquired image to identify a value of the periodic component parameter and a value of the continuous component parameter, it is possible to distinguish between ridge pixels and valley pixels. It is therefore possible to use only valley pixels or ridge pixels instead of all pixels together. E.g., the calculation of the average can be restricted to the values of valley pixels or ridge pixels only. It is also possible to first calculate an average of the values of the valley pixels alone or the ridge pixels in a direction perpendicular to the main direction, and then apply a unidirectional Gabor filter in accordance with the main direction.

Due to the difference in brightness between the ridge pixels and the valley pixels, a spatial variation independent of that caused by the test pattern may appear based on the spatial distribution of ridges and valleys for the dermatoglyphs. In particular, the proportion of ridge and valley pixels in each line varies with the design of the dermatoglyphs, which can introduce noise into the image analysis. The use of ridge pixels alone or of valley pixels alone therefore makes it possible to avoid spatial variations in the brightness of the acquired image caused by the difference. The method can therefore comprise, prior to the analysis step S3, a step of identifying the ridge pixels and/or valley pixels, and one or more subsequent steps of the method is then restricted to these pixels.

Once the value of the continuous component parameter B and the value of the periodic component parameter A have been determined, the automated data processing system 7 implements a fraud detection method (step S4) to authenticate that the part of the human body is an authentic feature of a human body based on the values of these two parameters. All methods to detect fraud and therefore to authenticate or not the finger on the basis of these parameters can be used. As known, a database is used for fraud detection based on a set of authentic and false fingers. It is, for example, possible to use a classifier to determine whether the finger on the contact surface 3 is an authentic finger or a false finger, the classifier's training being done on a training basis combining real fingers and false fingers. Preferably, the classifier is a support vector machine. It is also possible to use a convolutional neural network or a neural network resulting from deep learning. More simply, statistical approaches can be used, for example by comparing the determined parameters with thresholds.

The periodic component parameter A determined via the Fourier transform or the application of the Gabor filter is representative of the amplitude of the sinusoidal oscillation of the light intensity in the acquired image, itself resulting from the sinusoidal oscillation of the sinusoidal modulation of the light intensity of the light pattern. However, the periodic component parameter A may not exactly match the best approximation of this amplitude of sinusoidal oscillation, since each object presented to sensor 1, a false or real finger, has a different amplitude response that depends on many conditions. The same applies to the continuous component parameter B. However, for the implementation of the fraud detection method, this does not matter since any bias affecting optionally this parameter will be taken into account in the data against which the parameter will be compared.

The fraud detection method to authenticate that the part of the human body is an authentic feature of a human body may result in the indication that either the finger is considered false, i. e. the part of the human body is not authenticated and is considered a fraud, or that the finger is considered authentic, i. e. the part of the human body is authenticated. Alternatively to this binary result, it is also possible that the fraud detection method to authenticate that the part of the human body is an authentic feature of a human body results in an authenticity indicator, such as a score or a probability value that the presented part of the human body is authentic.

It is then possible to make a decision on the basis of the indication of authenticity as to the authenticity of the part of the human body presented, e.g. on the basis of other indicators of authenticity resulting from other fraud detection methods, in particular by using a classifier or a neural network.

Based on the result of the fraud detection method to authenticate that the part of the human body is an authentic feature of a human body, optionally finalized by a decision, more approaches can be adopted: the method can be stopped, alert information can be issued, or compensation of the sinusoidal oscillation of the light pattern and biometric identity recognition described below can be implemented. These last two implementations can be independent of the fraud detection method, and can be done in parallel or even beforehand.

Typically, if the finger is considered false, i.e. if the part of the human body is not authenticated and is considered to be a fraud, then the method can be stopped, and appropriate measures can be taken (generation of an alarm signal, etc.) as usual with fraud detection methods.

If the finger is considered authentic i. e. if the part of the human body is authenticated, the automated data processing system 7 implements a compensation (step S5) of the oscillation of the light pattern in the acquired image by multiplying the intensity of the acquired image by a function of a correction parameter derived from the previously determined periodic component parameter A, in order to obtain a compensated image. The compensation of the light pattern in the acquired image aims to provide fingerprint comparison algorithms with an image that is more representative of physical properties, i.e. the appearance of dermatoglyphs, and without artifacts that may impact it, originating in the sinusoidal modulation of light intensity in the pattern.

More precisely, the function of the correction parameter matches the inverse of a sinusoidal correction function having the correction parameter as amplitude and taking as a variable an x coordinate according to the main direction. The correction function $f_a(x)$ corresponds to:

$$f_a(x) = a \times \cos(2\pi f x + \varphi) + b$$

a being the correction parameter, wherein f is the target frequency, $\varphi$ is a phase, and b is a real constant.

The compensation therefore consists in dividing the pixel values of the acquired image by the matching values taken by the sinusoidal correction function to obtain the corrected image:

$$\text{Compensated image} = \text{acquired image}/f_a(x).$$

The pixel values of the acquired image are indeed considered as resulting from a multiplication of the values of the matching pixels of a finger image without a light pattern, which is sought as a compensated image, by a sinusoidal function representative of the sinusoidal oscillation of the light intensity. It is therefore sufficient to divide these values by the correction function to find the compensated image.

FIG. 6a shows an example of an acquired image of an authentic finger illuminated by the light source 4, while FIG. 7a shows an example of an acquired image of a false finger illuminated by the light source 4. Both images therefore present a variation in light intensity from bottom to top caused by the light pattern, and in particular have a sinusoidal oscillation of light intensity.

FIGS. 6b and 7b show examples of images compensated with a compensation function, respectively matching the acquired images shown in FIGS. 6a and 7a. It can be seen that there are no traces of any sinusoidal variation in light intensity in the bottom-up direction. The sinusoidal oscillation was therefore correctly compensated.

The compensated image can then be used to implement a biometric identity recognition method (step S6) on this compensated image, without the variation in light intensity in the acquired image attributable to the light pattern hindering biometric identity recognition. Biometric identity recognition may comprise the exploitation of papillary prints in the compensated image, by conventional biometric identity recognition methods, typically based on the detection of minutiae in the prints and their comparison with a database. The compensated image can also be used to be stored in a database, or to extract information such as minutiae to feed into the database, e.g. in an enrollment process of the person placing his finger on the contact surface 3 of the sensor 1, so that this person can later be identified.

The compensated image can be displayed on a screen for a user, typically the person placing his/her finger on the contact surface 3 of the sensor 1. The compensation of the light pattern makes it possible to hide the biometric fraud detection method used. A person seeking to defraud the biometric identity recognition method with a false finger then does not have access, via the visual feedback that displays the image on a screen, to the information whereby a sinusoidal variation in light intensity in accordance with the main direction is used, nor to characteristics such as the amplitude of the sinusoidal oscillation or the target frequency.

It should be noted that only the sinusoidal oscillation must be compensated. The continuous component does not specifically need to be corrected, since it simply signifies a translation of all pixel values, and therefore a global brightening or a global darkening of the compensated image with respect to the acquired image. However, the continuous component can be corrected in the same way as conventional state of the art methods using uniform illumination.

It is therefore possible to set a predetermined constant value for the continuous parameter b of the correction function. Typically, where b=1, we obtain a correction function (sinusoidal) varying around 1, so that the compensation does not modify the average pixel values of the image. However, it is possible to use a value other than 1, in order to avoid for example optional saturations. The setting of the continuous parameter b means that only the correction parameter a must be determined. This correction parameter a is derived from the periodic component parameter A determined herein before.

In a first approach, the value of the correction parameter a can simply match the value of the previously obtained periodic component parameter A, divided by the value of the continuous component parameter B of the acquired image, whether the value of the periodic component parameter A was obtained by the Fourier transform or by applying the Gabor filter. However, as mentioned hereon before, the value of the periodic component parameter A obtained through the Fourier transform or by applying the Gabor filter may match the best value for the correction parameter. The compensation of the test pattern in the compensated image may then not be complete.

It is therefore preferable to determine, from the periodic component parameter A, a correction parameter a making it possible to compensate the test pattern with greater accuracy.

For this purpose, it is possible to search iteratively for the correction parameter a. For a plurality of values of the correction parameter a, around the value of the periodic component parameter A, the following steps are implemented:

the acquired image is compensated by a correction function taking the correction parameter a as parameter and taking as variable the x-coordinate in accordance with the main direction, as previously indicated, to obtain a compensated image;

the Gabor filter is applied to the compensated image to obtain a filtered image;

a Gabor module of the filtered image is then calculated.

The Gabor filter is used herein to measure the presence of sinusoidal oscillation in the compensated image. The aim is therefore to minimize the Gabor module obtained, since the minimization of the module indicates the minimization of the presence of sinusoidal oscillation in the compensated image. The value of the compensation parameter a retained at the end of the iterations is the value that results in the smallest Gabor module.

It is possible to summarize this iterative approach by means of an objective function, which takes as input a value to be tested from the correction parameter a, and provides as output the Gabor module of the filtered image as a result. Finding the optimal value of the correction parameter is like trying to minimize this objective function.

It is thus possible to test a whole set of values of the correction parameter a around the value of the periodic component parameter A. In order to limit the calculations and accelerate the implementation of the method, it is also possible to implement an optimization of the choice of values of the correction parameter a, and for example, to use a gradient descent algorithm to determine the values to be tested from the correction parameter a.

This approach makes it possible to obtain an optimal value of the correction parameter a, which is applied to the compensation of the test pattern in the acquired image, so that the variation in light intensity in accordance with the main direction is sufficiently compensated so that the sinusoidal oscillation is no longer present in the acquired image. It should be noted that this approach to finding an optimal value for the correction parameter a may also have been implemented for the image analysis step S3 to detect fraud.

However, this approach requires heavy calculations, and therefore requires significant material resources, and calculation time that may be too long. Another approach is therefore to use the value of the periodic component parameter determined through the Fourier transform or the application of the Gabor filter to search a database for a value of the correction parameter associated with this value of the periodic component parameter. The database is, for example, built from a training database of acquired images for which the determination of the value of the periodic component parameter via the Fourier transform or the application of the Gabor filter and the determination of the correction parameter by the iterative approach described herein before have been implemented. From this set of value pairs of the periodic component parameter-value of the correction parameter, the database can be completed, e.g., by linear regression interpolation in order to be able to associate a value of the correction parameter to each value of the periodic component parameter determined through the Fourier transform or the application of the Gabor filter. This approach makes it possible to determine a correction parameter value more suitable for the compensation of the test pattern, without having to implement iterative determination of the value of the periodic component parameter each time.

The invention is not limited to the embodiment described and depicted in the attached Figures. Changes remain possible, in particular with regard to the constitution of the various technical characteristics or by substitution of technical equivalents, without however leaving the protection scope of the invention.

The invention claimed is:

1. A Device for the biometric acquisition and processing of an image of a part of the human body presenting dermatoglyphs, comprising:
   a contact surface configured so that the part of the human body is affixed to this contact surface,
   a light source configured to illuminate the contact surface,
   an imager configured to acquire an image of the part of the human body affixed to the contact surface,
   an automated data processing system comprising a processor and a memory, said automated data processing system configured to receive the image acquired by the imager, characterized in that the light source is configured to project on the part of the human body affixed to the contact surface a light pattern having a sinusoidal modulation of light intensity according to a main direction with a target frequency, and in that the automated data processing system is configured to perform the following steps:
   a) analysis of the acquired image to identify in it at least one value of a periodic component parameter and one value of a continuous component parameter of a variation in light intensity in accordance with the main direction, wherein the value of the periodic component parameter is representative of an amplitude of a sinusoidal oscillation of light intensity in the acquired image in accordance with the main direction at the target frequency, wherein the value of the continuous component parameter is representative of an average of the light intensities in the acquired image;
   b) implementation on the basis of the value of the continuous component parameter and the value of the periodic component parameter of a fraud detection method to authenticate that the part of the human body is an authentic feature of a human body;
   c) compensation of the sinusoidal oscillation of the light intensity in the acquired image by multiplying the intensity of the acquired image by a correction function comprising a correction parameter representative of an amplitude of a sinusoidal oscillation of the light intensity in the acquired image in accordance with the main direction at the target frequency, in order to obtain a compensated image;
   d) implementation of a biometric identity recognition method based on the compensated image.

2. The device according to claim 1, wherein the correction function corresponds to the inverse of a sinusoidal function taking as a variable a coordinate according to the main direction and whose amplitude is the value of the correction parameter.

3. The device according to claim 1, wherein the periodic component parameter corresponds to an amplitude of a sinusoidal function taking as a variable a coordinate according to the main direction.

4. The device according to claim 1, wherein the image analysis comprises determining a Fourier transform of the intensity distribution of the image, wherein the value of the periodic component parameter is determined from a coefficient of the Fourier transform at the target frequency.

5. The device according to claim 1, wherein the image analysis comprises applying to the acquired image a Gabor filter to obtain a filtered image, a parameter of the Gabor filter in accordance with the main direction corresponding to the target frequency, the value of the periodic component parameter being determined from the filtered image.

6. The device according to claim 5, wherein the value of the periodic component parameter is the sum of the modules of each of the points of the filtered image.

7. The device according to claim 1, wherein the value of the correction parameter corresponds to the value of the periodic component parameter divided by the continuous component parameter.

8. The device according to claim 1, wherein the value of the correction parameter is determined from the value of the periodic component parameter using a database associating a correction parameter value with a value of the periodic component parameter.

9. The device according to claim 1, in which the value of the correction parameter is determined iteratively by the implementation of the following steps, for a plurality of values to be tested of the correction parameter:
the acquired image is compensated by a correction function taking the value of the correction parameter to be tested as a parameter and taking the coordinate in accordance with the main direction as a variable to obtain a compensated image;
application of a Gabor filter to the compensated image to obtain a filtered image, a parameter of the Gabor filter in accordance with the main direction corresponding to the target frequency;
determination of a measurement of the presence of sinusoidal oscillation in the filtered image;
wherein the value of the correction parameter is the value to be tested which provides the measurement of the presence of the sinusoidal oscillation in the lowest filtered image.

10. The device according to claim 1, wherein the light source is provided with a mask presenting a sinusoidally variable opacity in accordance with the main direction.

11. The device according to claim 1 wherein the target frequency is between 0.2 cycle/mm and 0.5 cycle/mm.

12. A method of acquiring and processing an image of a part of the human body having dermatoglyphs, said method being carried out by a device comprising:
a contact surface configured so that the part of the human body is affixed to this contact surface,
a light source configured to illuminate the contact surface,
an imager configured to acquire an image of the part of the human body affixed to the contact surface,
an automated data processing system comprising a processor and a memory, said automated data processing system configured to receive the image acquired by the imager, the method comprising the following steps:
the light source projects onto the part of the human body affixed to the contact surfaced a light pattern having a sinusoidal modulation of light intensity in a main direction with a target frequency;
the imager acquires an image of the part of the human body affixed to the contact surface illuminated by the light source, and transmits the acquired image to the automated data processing system;
the automated data processing system analyzes the acquired image to identify in it at least one value of a periodic component parameter and one value of a continuous component parameter of a variation in light intensity in accordance with the main direction, the value of the periodic component parameter being representative of an amplitude of a sinusoidal oscillation of the light intensity in the acquired image in accordance with the main direction at the target frequency, the value of the continuous component parameter being representative of an average of the light intensities in the acquired image;
the automated data processing system implements on the basis of the value of the continuous component parameter and the value of the periodic component parameter a fraud detection method to authenticate that the part of the human body is an authentic feature of a human body;
the automated data processing system compensates the sinusoidal oscillation of the light intensity in the acquired image by multiplying the intensity of the acquired image by a correction function comprising a correction parameter representative of an amplitude of a sinusoidal oscillation of the light intensity in the acquired image in accordance with the main direction at the target frequency, in order to obtain a compensated image;
the automated data processing system implements a biometric identity recognition method based on the compensated image.

* * * * *